United States Patent [19]
Fogle, Jr. et al.

[11] Patent Number: 5,736,668
[45] Date of Patent: Apr. 7, 1998

[54] INFLATOR FOR AN INFLATABLE VEHICLE OCCUPANT PROTECTION DEVICE

[75] Inventors: Homer W. Fogle, Jr., Mesa; Daniel R. Hake, Scottsdale, both of Ariz.

[73] Assignee: TRW Inc., Lyndhurst, Ohio

[21] Appl. No.: 653,800

[22] Filed: May 28, 1996

[51] Int. Cl.⁶ .................................................. F42C 19/12
[52] U.S. Cl. .................................................. 102/202.5
[58] Field of Search ........................ 102/202.7, 202.8, 102/202.9, 202.5, 202; 361/266; 337/297; 280/737, 741; 313/491, 341, 271, 631

[56] References Cited

U.S. PATENT DOCUMENTS

| | | | |
|---|---|---|---|
| 3,157,120 | 11/1964 | Morgan et al. | 102/202.7 |
| 3,160,789 | 12/1964 | Morgan | 102/202.7 |
| 3,320,889 | 5/1967 | Holtz | 102/202.7 |
| 3,366,055 | 1/1968 | Hollander, Jr. | 102/202.8 |
| 3,822,895 | 7/1974 | Ochiai. | |
| 3,974,424 | 8/1976 | Lee | 317/80 |
| 4,208,967 | 6/1980 | Betts | 102/202.7 |
| 4,220,088 | 9/1980 | Kimura et al. | |
| 4,271,453 | 6/1981 | Yajima et al. | 361/248 |
| 4,517,895 | 5/1985 | Rucker | 102/202.2 |
| 4,655,137 | 4/1987 | Boltz | 102/202 |
| 5,348,344 | 9/1994 | Blumenthal et al. | 280/737 |
| 5,403,036 | 4/1995 | Zakula et al. | 280/741 |
| 5,428,988 | 7/1995 | Starkovich | 73/40 |
| 5,429,030 | 7/1995 | Tidman | 89/7 |
| 5,432,378 | 7/1995 | Whitney et al. | 257/529 |
| 5,452,661 | 9/1995 | Neff | 102/202.7 |
| 5,470,104 | 11/1995 | Smith et al. | 280/737 |
| 5,496,062 | 3/1996 | Rink et al. | 280/737 |
| 5,566,976 | 10/1996 | Cuevas | 280/737 |
| 5,572,181 | 11/1996 | Kiryu et al. | 337/273 |

*Primary Examiner*—Michael J. Carone
*Assistant Examiner*—Christopher K. Montgomery
*Attorney, Agent, or Firm*—Tarolli, Sundheim, Covell, Tummino & Szabo

[57] ABSTRACT

An inflatable vehicle occupant protection apparatus (10) includes combustible fluid (18) and a pair of electrodes (102,104). The electrodes (102,104) have a corresponding pair of surface portions (126,128) which are spaced from each other across an electrode gap (130). An ohmic heating element (120) bridges the gap (130) in an ignitable heat transferring relationship with the combustible fluid (18). The heating element (120) has a pair of opposite end portions (132,134) which are mounted on, and fixed to, the surface portions (126,128) of the electrodes (102,104). The surface portions (126,128) of the electrodes (102,104) have arcuate contours facing oppositely across the gap (130).

11 Claims, 4 Drawing Sheets

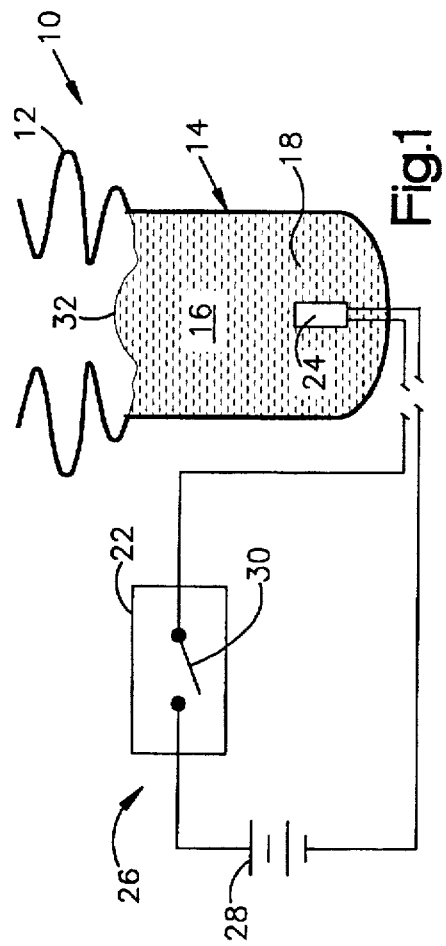
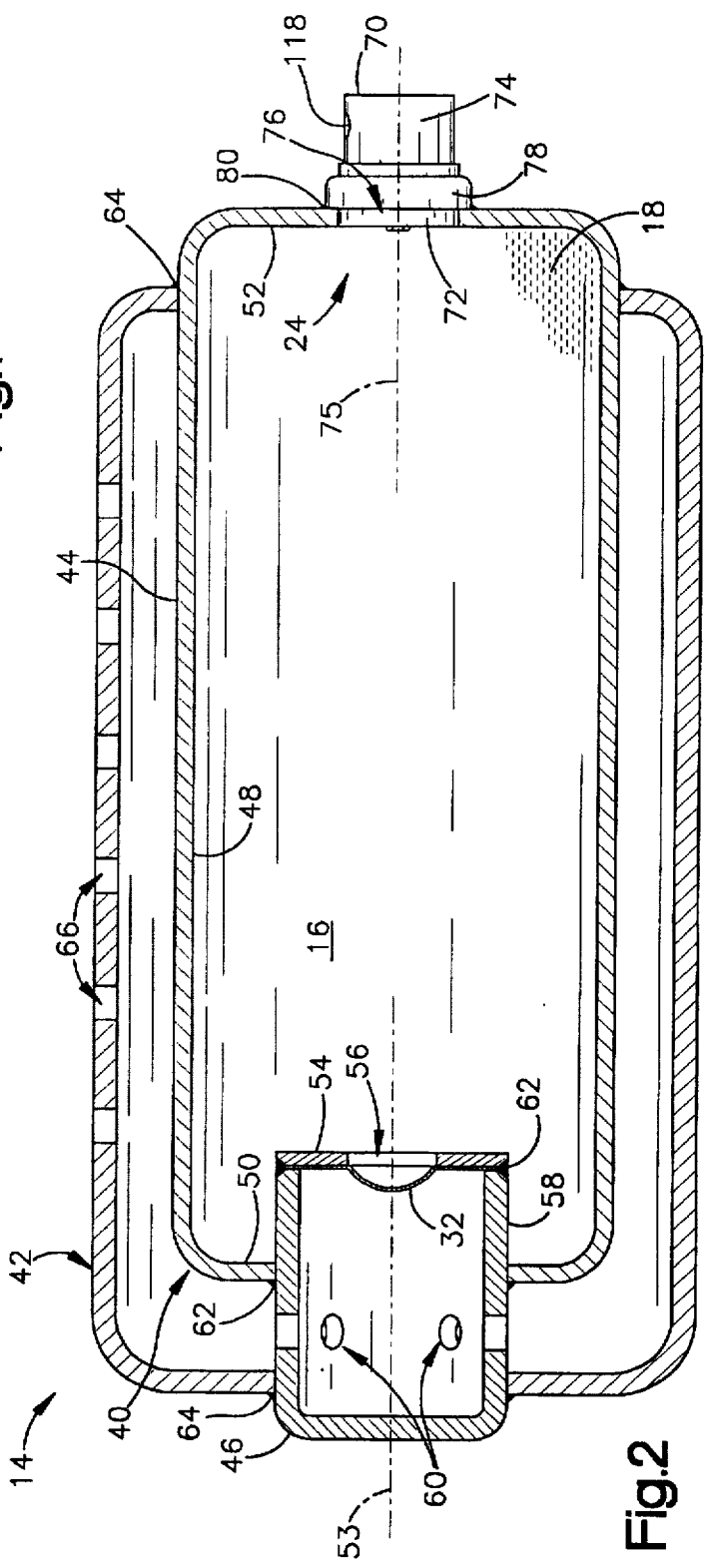

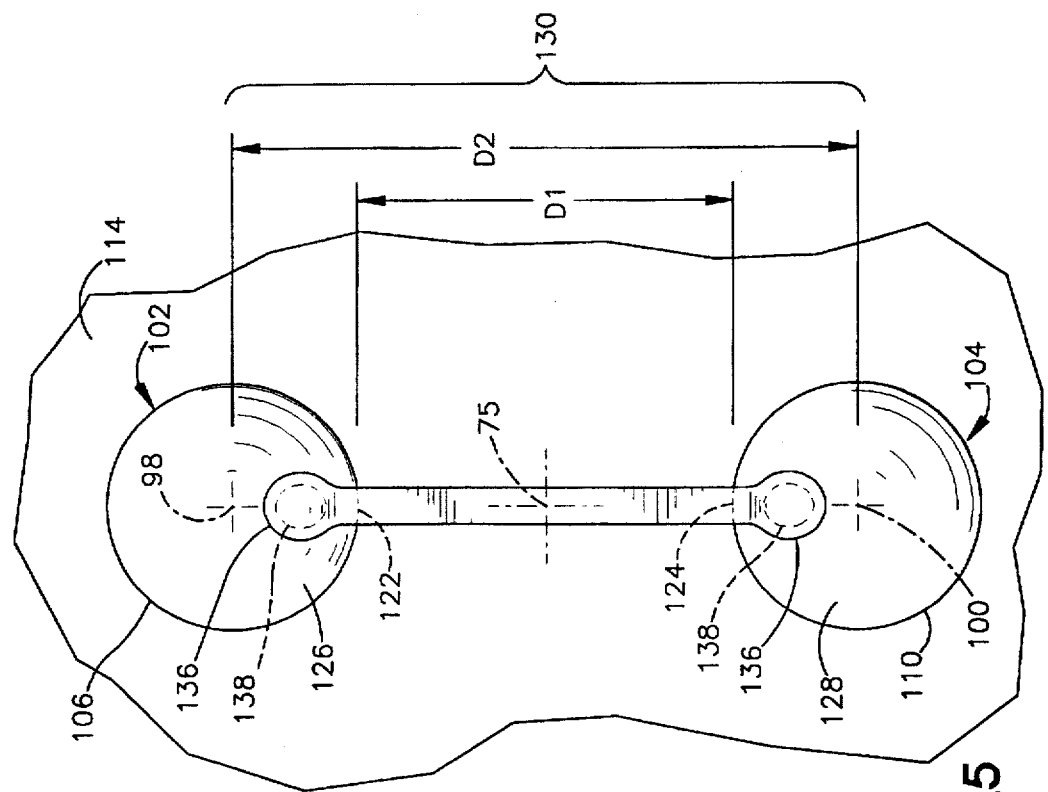
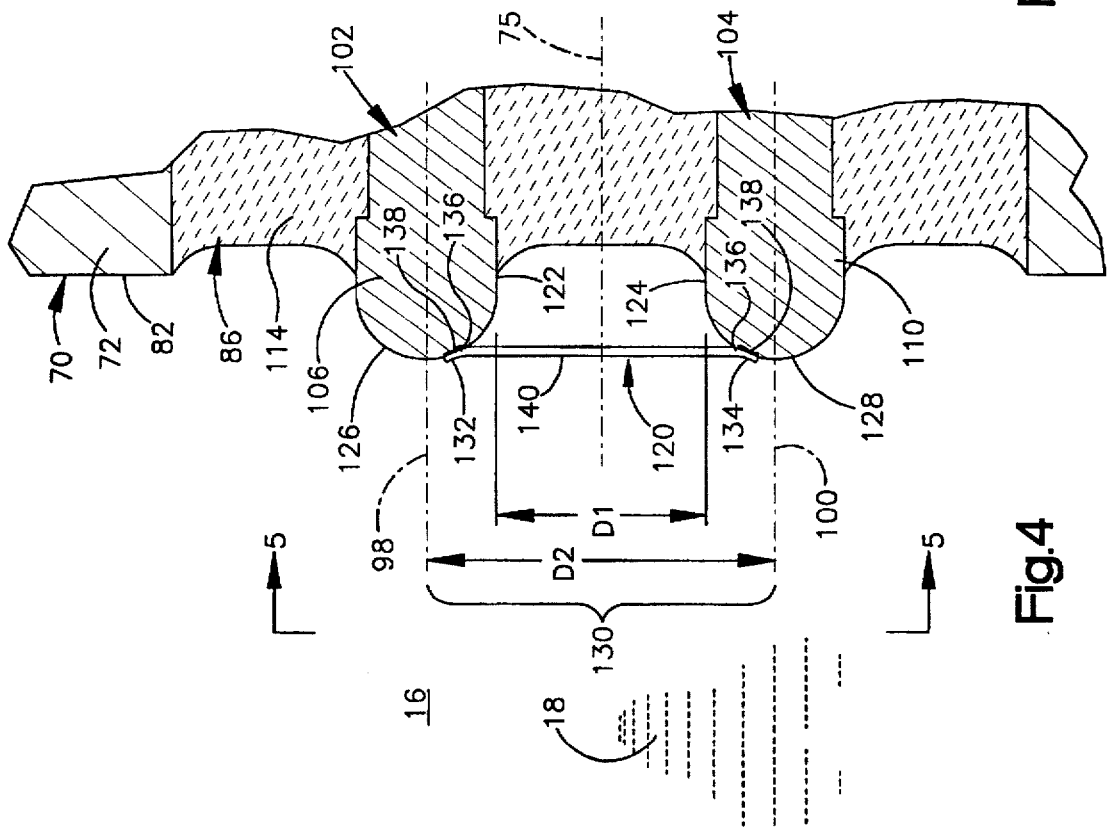

INFLATOR FOR AN INFLATABLE VEHICLE OCCUPANT PROTECTION DEVICE

FIELD OF THE INVENTION

The present invention relates to an inflator, and particularly relates to an inflator for an inflatable vehicle occupant protection device such as an air bag.

BACKGROUND OF THE INVENTION

An inflator for an inflatable vehicle occupant protection device, such as an air bag, may include a pressure vessel containing inflation fluid for inflating the air bag. Such an inflator is disclosed in U.S. Pat. No. 5,348,344. In the inflator disclosed in the '344 patent, the inflation fluid is an ingredient in a mixture of gases. The mixture of gases further includes a fuel gas which, when ignited, heats the inflation fluid.

The inflator has an igniter containing a small charge of pyrotechnic material. The igniter further contains a bridgewire which is supported in an ignitable heat transferring relationship with the pyrotechnic material. When the air bag is to be inflated, an actuating level of electric current is directed through the bridgewire in the igniter. This causes the bridgewire to become resistively heated sufficiently to ignite the pyrotechnic material. The pyrotechnic material then produces combustion products which, in turn, ignite the fuel gas in the pressure vessel.

The fluid pressure inside the pressure vessel is increased by the heat generated upon combustion of the fuel gas. When the increasing fluid pressure reaches a predetermined elevated level, the pressure vessel is opened. The inflation fluid then flows outward from the pressure vessel and into the air bag to inflate the air bag.

SUMMARY OF THE INVENTION

In accordance with the present invention, an apparatus comprises combustible fluid and a pair of electrodes. The electrodes have a corresponding pair of surface portions which are spaced from each other across an electrode gap. An ohmic heating element bridges the gap in an ignitable heat transferring relationship with the combustible fluid. The heating element has a pair of opposite end portions which are mounted on, and fixed to, the surface portions of the electrodes. The surface portions of the electrodes have arcuate contours facing oppositely across the gap.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a first embodiment of the present invention;

FIG. 2 is an enlarged, partly sectional view of parts shown in FIG. 1;

FIG. 4 is an enlarged partial view of parts shown in FIG. 3;

FIG. 5 is a view taken on line 5—5 of FIG. 4; and

DESCRIPTION OF PREFERRED EMBODIMENTS

Figure 3:
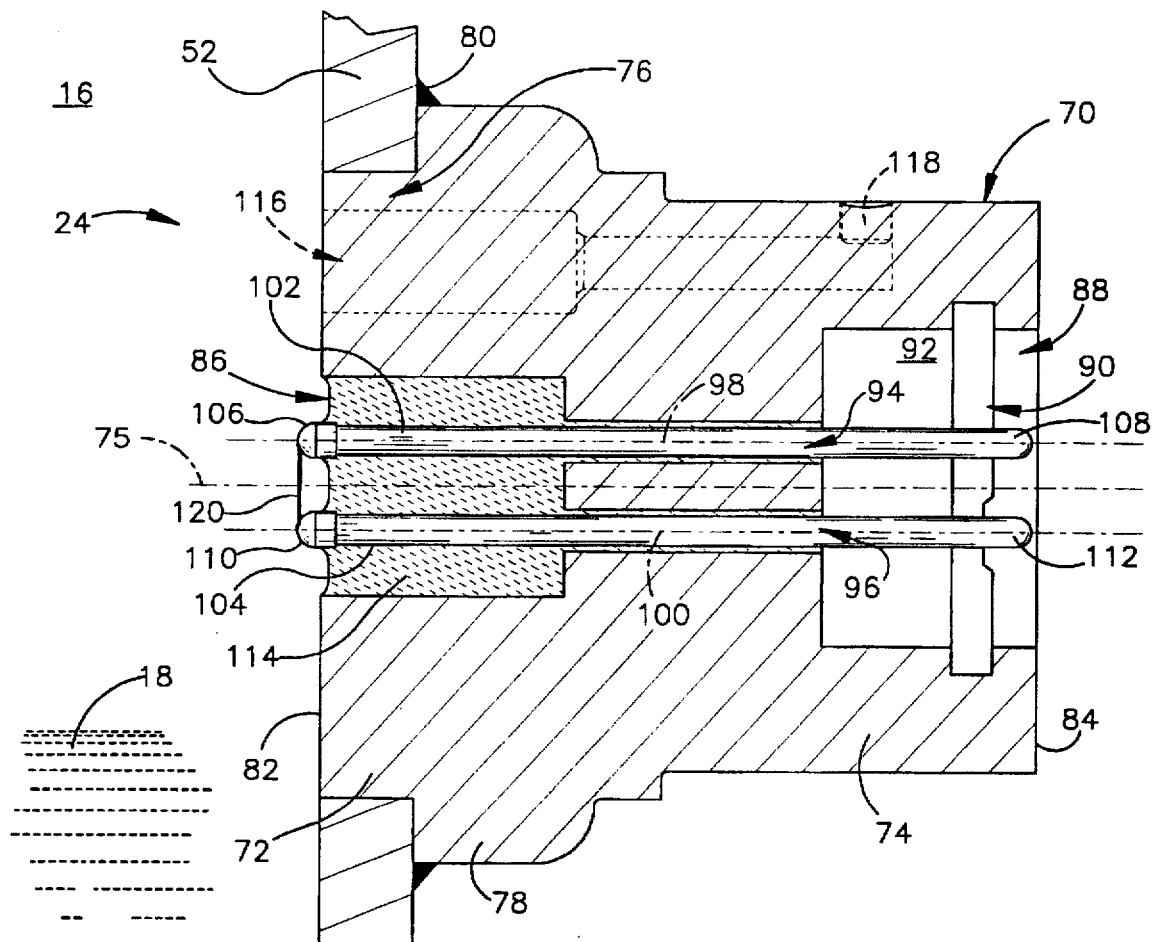
FIG. 3 is an enlarged sectional view of parts shown in FIG. 2.

A vehicle occupant protection apparatus 10 comprising a first embodiment of the present invention is shown schematically in FIG. 1. The apparatus 10 includes a particular type of inflatable vehicle occupant protection device 12 which is commonly referred to as an air bag. The apparatus 10 further includes an inflator 14 for inflating the air bag 12. Other inflatable vehicle occupant protection devices that can be used in accordance with the present invention include inflatable seat belts, inflatable knee bolsters, inflatable head liners, and knee bolsters operated by inflatable air bags.

The inflator 14 has a storage chamber 16 which holds combustible fluid 18. The combustible fluid 18 preferably comprises a combustible mixture of gases, and most preferably comprises a combustible mixture of gases in accordance with the invention set forth in U.S. Pat. No. 5,348,344, assigned to TRW Vehicle Safety Systems Inc. Accordingly, the combustible fluid 18 in the first embodiment of the present invention comprises a mixture of gases which preferably includes a fuel gas, an oxidizer gas for supporting combustion of the fuel gas, and an inert gas. The inert gas is preferably nitrogen, argon, or a mixture of nitrogen and argon. The oxidizer gas is preferably oxygen. The fuel gas is preferably hydrogen. Examples of other fuel gases are carbon monoxide, hydrocarbons such as methane, propane, or acetylene, and mixtures of hydrogen and one or more hydrocarbons.

The mixture 18 of gases in the storage chamber 16 readily combusts when ignited, but otherwise is not explosive. As such, the mixture 18 of gases could have any one of many different compositions. For example, the fuel gas may be 2 to 16 molar percent of the mixture 18 of gases, with the oxidizer gas being 7 to 98 molar percent of the mixture 18 of gases, and with the balance being inert gas at 0 to 91 molar percent of the mixture 18 of gases. Preferably, such a mixture 18 of gases includes 10–14 molar percent hydrogen, 15–25 molar percent oxygen, and 61–75 molar percent inert gas. Moreover, the mixture 18 of gases in the storage chamber 16 may comprise an oxidizer gas and a fuel gas in amounts which provide a very fuel lean mixture, i.e., a mixture in which the amount of oxidizer gas exceeds that amount required to support combustion of the fuel gas.

In another example, the mixture 18 of gases is dry air and hydrogen. The mixture of dry air and hydrogen may range from 86 molar percent air and 14 molar percent hydrogen to 92 molar percent air and 8 molar percent hydrogen. If the amount of hydrogen in the mixture 18 of gases is less than about 8 molar percent, difficulty may be encountered in igniting the hydrogen. In such a mixture, it is preferred to have a range from 90 molar percent air and 10 molar percent hydrogen to 87 molar percent air and 13 molar percent hydrogen.

The mixture 18 of gases in the storage chamber 16 is normally stored under pressure. The storage pressure depends upon such factors as the volume of the air bag 12 or other inflatable device to be inflated, the time available for inflation, the inflation pressure desired, the volume of the storage chamber 16, and the percentage of each of the gases in the mixture 18 of gases. Normally, the mixture 18 of gases in the storage chamber 16 may be at a storage pressure of approximately 500 to approximately 5,000 pounds per square inch (psi).

Although the mixture 18 of gases in the preferred embodiments of the present invention is stored as a whole in the storage chamber 16, ingredients of the mixture 18 could alternatively be stored separately, with the mixture 18 being created by mixing the ingredients when the inflator 14 is actuated. For example, as disclosed in U.S. Pat. No. 5,348,344, a fuel gas and an oxidizer gas could be stored separately from an inert gas, and could be mixed with the inert gas upon actuation of the corresponding inflator.

The apparatus 10 further includes a collision sensor 22 and an electrically actuatable igniter 24. As shown schematically in FIG. 1, the collision sensor 22 and the igniter 24 are included in an electrical circuit 26 with a power source 28. The power source 28 is preferably the vehicle battery and/or a capacitor. The collision sensor 22 includes a normally open switch 30. As known in the art, the collision sensor 22 monitors vehicle conditions to sense a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect an occupant of the vehicle. The switch 30 then closes and an actuating level of electric current is directed to flow through the igniter 24 to actuate the igniter 24.

When the igniter 24 is actuated, it ignites the fuel gas in the mixture 18 of gases. The resulting combustion of the fuel gas is supported by the oxidizer gas. As the fuel gas burns, the pressure in the storage chamber 16 rises due to warming of the gases by the heat of combustion created by burning of the fuel gas. After a predetermined time, or when a predetermined pressure is reached in the storage chamber 16, a rupturable closure wall 32 of the inflator 14 bursts open. The warm inflation gas is thus released to flow outward from the storage chamber 16 and into the air bag 12 to inflate the air bag 12.

Preferably, the fuel gas is included in the mixture 18 of gases in an amount so that it is substantially consumed by combustion in the storage chamber 16. The air bag 12 is thus inflated almost exclusively, in the case where inert gas is used, by inert gas, combustion products created by burning of the fuel gas, and any remaining oxidizer gas. In the case where inert gas is not used, the air bag 12 is inflated almost exclusively by combustion products and the remaining oxidizer gas.

The warm inflation gas expands and cools as it flows from the inflator 14 into the air bag 12. In addition, air from the environment of the apparatus 10 may be aspirated into the air bag 12 as the air bag 12 is being inflated. This aspirated air will also cool the inflation gas.

As shown in greater detail in FIG. 2, the inflator 14 preferably comprises a pressure vessel 40 and a diffuser 42. As an example of a pressure vessel that can be used in accordance with the present invention, the pressure vessel 40 includes a tank 44 and a manifold 46. The tank 44 has an elongated cylindrical body wall 48 and a pair of circular opposite end walls 50 and 52, each of which is centered on a longitudinal central axis 53. The manifold 46 also is cylindrical, and extends closely through a circular opening at the center of the first end wall 50 of the tank 44. A circular end wall 54 of the manifold 46 is located inside the tank 44. The end wall 54 has a centrally located orifice 56. A cylindrical side wall 58 of the manifold 46 has a circumferentially extending array of gas flow openings 60 located outside the tank 44. The rupturable closure wall 32, which is shown schematically in FIG. 1, preferably comprises a burst disk supported inside the manifold 46 between the orifice 56 and the gas flow openings 60.

The walls 48–52 of the tank 44, the walls 54 and 58 of the manifold 46, and the closure wall 32 together define the volume of the storage chamber 16 in which the mixture 18 of gases is contained under pressure. Those portions of the pressure vessel 40 are preferably formed of metal, such as steel or aluminum, and welds 62 are provided to seal the storage chamber 16 around the periphery of the manifold 46. The pressure vessel 40 could be formed of an alternative material, such as a composite plastic material, with the storage chamber 16 being sealed by any suitable alternative sealing structure known in the art.

In the preferred embodiments of the present invention, the diffuser 42 also is formed of metal, and is fixed to the pressure vessel 40 by corresponding welds 64. A plurality of gas outlet openings 66 extend through the diffuser 42 in an array located at one side of the diffuser 42.

As shown in FIG. 2, the igniter 24 has a cylindrical body 70 with inner and outer end portions 72 and 74 centered on an axis 75. The inner end portion 72 of the body 70 extends closely through a circular opening 76 at the center of the second end wall 52 of the tank 44. An annular flange 78 projects radially outward from the body 70 between the inner and outer end portions 72 and 74, and abuts the second end wall 52 of the tank 44 radially outward of the opening 76. A circumferentially extending weld 80 fixes the igniter 24 to the second end wall 52 of the tank 44 at the periphery of the flange 78. The weld 80 blocks the mixture of gases 18 in the storage chamber 16 from leaking outward through the opening 76.

The body 70 of the igniter 24 is preferably formed of stainless steel, but may alternatively be formed of any other suitable material. Most preferably, the body 70 is formed of stainless steel type 304, UNS S30400 per ASTM A 276 or ASTM A 479.

As shown in greater detail in FIG. 3, the body 70 of the igniter 24 has first and second opposite end surfaces 82 and 84, each of which has an annular shape centered on the axis 75. A first cylindrical cavity 86 extends into the body 70 along the axis 75 from the first end surface 82. A second cylindrical cavity 88 extends into the body 70 oppositely along the axis 75 from the second end surface 84. A groove 90 extends radially outward from the second cavity 88 at a location spaced a short distance from the second end surface 84. The groove 90 and the second cavity 88 together define a socket 92 for receiving an electrical connector (not shown) in the electrical circuit 26 of FIG. 1. Such an electrical connector, and the manner in which it fits in the socket 92, is known in the art.

A pair of passages 94 and 96 extend through the body 70 of the igniter 24 between the two cavities 86 and 88. The passages 94 and 96 are centered on respective axes 98 and 100 which are parallel to, and equally spaced radially from, the central axis 75 of the body 70. A corresponding pair of electrode pins 102 and 104 extend axially through the passages 94 and 96.

The first electrode pin 102 has an inner end portion 106 projecting a short distance from the first cavity 86 into the storage chamber 16. The first electrode pin 102 further has an outer end portion 108 extending out of the passage 94 and nearly the entire depth of the second cavity 88 toward the second end surface 84. The second electrode pin 104 is identical to the first electrode pin 102, and is axially coextensive with the first electrode pin 102. The second electrode pin 104 thus has inner and outer end portions 110 and 112 adjacent to, but spaced from, the inner and outer end portions 106 and 108 of the first electrode pin 102.

The electrode pins 102 and 104 may be formed of any suitable metal material. In the preferred embodiment of the present invention, the electrode pins 102 and 104 are both formed of an iron-nickel alloy, UNS NI4052 (Alloy 52) per ASTM F30, and are gold plated per MIL-G-45204, GRADE C, CLASS 2.

A glass seal 114 extends fully around the electrode pins 102 and 104 throughout the first cavity 86 and the passages 94 and 96. The glass seal 114 supports the electrode pins 102 and 104 in parallel positions centered on the axes 98 and 100, and electrically insulates the electrode pins 102 and 104 from the stainless steel material of the body 70. Such a glass seal is known in the art, and is bonded to the body 70 and the electrode pins 102 and 104 in a known manner to define a hermetic seal between the storage chamber 16 and the second cavity 88.

As further shown in FIG. 3, a fill passage 116 preferably extends through the body 70 of the igniter 24. The fill passage 116 may have any size and configuration suitable for containing a check valve (not shown) for filling the storage chamber 16 with the combustible mixture 18 of gases. Such a check valve also is known in the art. The fill passage 116 is closed and sealed by a welded plug 118 in a known manner when the storage chamber 16 has been filled.

The igniter 24 further includes an ohmic (resistive) heating element in the form of a bridgewire 120. The bridgewire 120 extends between the electrode pins 102 and 104 at their inner end portions 106 and 110. Since the inner end portions 106 and 110 of the electrode pins 102 and 104 project into the storage chamber 16, as noted above, the bridgewire 120 is immersed in the mixture 18 of gases in the storage chamber 16. The bridgewire 120 thus extends between the electrode pins 102 and 104 in an ignitable heat transferring relationship with the fuel gas in the mixture 18 of gases.

The bridgewire 120 is preferably formed of metal material which is non-catalytic. By "non-catalytic" it is meant that the material is free of any metal which would function catalytically to initiate spontaneous ignition of the fuel gas in which the bridgewire 120 is immersed. In the preferred embodiment of the present invention, the bridgewire 120 is thus formed of metal material which is free of any one or more of the noble metal elements to preclude the possibility of spontaneous ignition of the fuel gas in the mixture 18 of gases. The metal material of which the bridgewire 120 is formed may otherwise have any suitable composition known in the art, but preferred materials include alloys of stainless steel, tungsten, and nickel-chromium. A wire formed of such a metal material can be obtained from sources such as Molecu-Wire Corporation of Farmingdale, N.J.; California Fine Wire Company of Grover City, Calif.; and HP Reid Company, Inc. of Neptune, N.J. Alternatively, the bridgewire 120 could be formed of metal materials that are selected to undergo an exothermic alloying reaction in accordance with the invention set forth in copending U.S. patent application Ser. No. 08/650,294, now abandoned, filed May 20, 1996, entitled "Inflator for an Inflatable Vehicle Occupant Protection Device," and assigned to TRW Inc.

As shown in enlarged detail in FIGS. 4 and 5, the inner end portions 106 and 110 of the electrode pins 102 and 104 have cylindrical side surfaces 122 and 124 centered on the corresponding axes 98 and 100. The side surfaces 122 and 124 are spaced from each other a first distance D1. The axes 98 and 100 are spaced from each other a second, greater distance D2.

The inner end portions 106 and 110 of the electrode pins 102 and 104 further have respective terminal end surfaces 126 and 128. The terminal end surfaces 126 and 128 have spherical contours centered on the axes 98 and 100. The terminal end surfaces 126 and 128 thus have arcuate profiles (FIG. 4) extending from the side surfaces 122 and 124 to the axes 98 and 100. In this arrangement, portions of the terminal end surfaces 126 and 128 face generally oppositely toward each other to define an electrode gap 130 which varies in length from the first distance D1 to the second distance D2.

The bridgewire 120 bridges the gap 130 between the terminal end surfaces 126 and 128 of the electrode pins 102 and 104. Specifically, a pair of opposite end portions 132 and 134 of the bridgewire 120 are mounted on the terminal end surfaces 126 and 128, respectively, and are fixed to the terminal end surfaces 126 and 128 at joints 136 defined by electrical resistance welds 138. A major portion 140 of the bridgewire 120 extends in a linear configuration between the opposite end portions 132 and 134. The major portion 140 has a circular cross-sectional shape, but the end portions 132 and 134 become flattened relative to the major portion 140 under the pressure of the welding electrodes (not shown) that are used to form the resistance welds 138.

Since the gap 130 varies in length throughout a range extending from D1 to D2, the bridgewire 120 can have any predetermined length within a corresponding range. Moreover, the terminal end surfaces 126 and 128 diverge from the joints 136 as a result of their arcuate profiles. This helps to ensure that the major portion 140 of the bridgewire 120 is suspended between the joints 136 along its entire length without contacting another electrically conductive surface.

When the igniter 24 is actuated, as described above with reference to FIG. 1, the actuating level of electric current is directed through the igniter 24 between the electrode pins 102 and 104. As the actuating level of electric current is conducted through the bridgewire 120 between the electrode pins 102 and 104, the bridgewire 120 resistively generates heat which is transferred directly to the mixture 18 of gases in which the bridgewire 120 is immersed. Such heat is generated substantially entirely by the major portion 140 of the bridgewire 120, which is suspended in the mixture 18 of gases along its entire length, as described above. The bridgewire 120 preferably conducts a sufficient electric current for a sufficient time to reach an elevated temperature at which it fuses, i.e., melts. Most preferably, the elevated temperature is high enough for the bridgewire 120 to form a high temperature plasma. The bridgewire 120 thus provides thermal energy which increases the temperature of the fuel gas sufficiently to ignite the fuel gas.

Combustion of the fuel gas generates heat which increases the pressure in the storage chamber 16. When the increasing pressure in the storage chamber 16 reaches a predetermined elevated level, the closure wall 32 (FIG. 2) bursts open. Pressurized gas then flows from the storage chamber 16 through the manifold 46 to the outlet openings 66 in the diffuser 42, and through the outlet openings 66 into the air bag 12 (FIG. 1).

Figure 6:
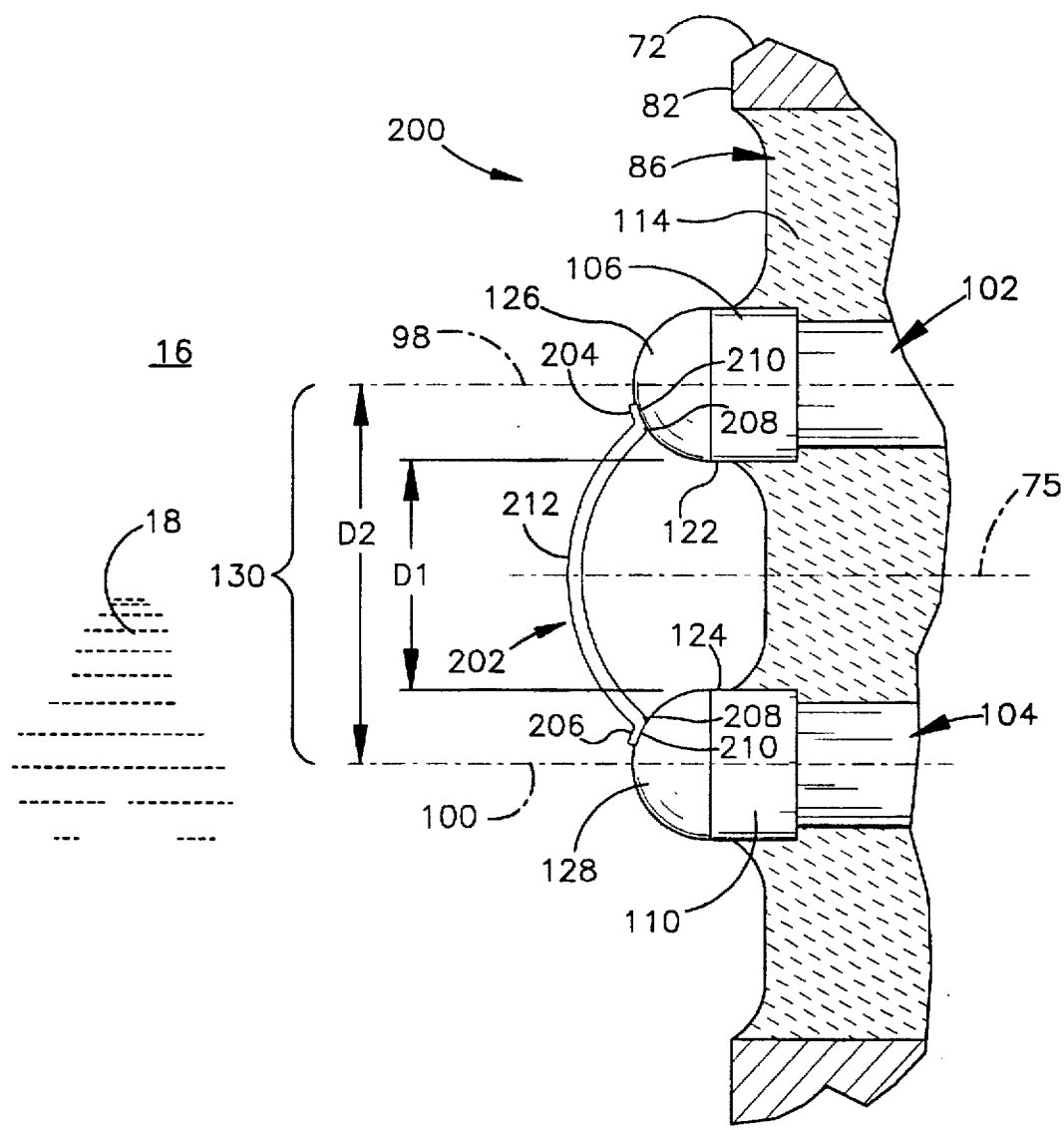
FIG. 6 is an enlarged partial view of parts of a vehicle occupant protection apparatus comprising a second embodiment of the present invention.

A second embodiment of the present invention is shown partially in FIG. 6. The partial view of the second embodiment shown in FIG. 6 corresponds with the partial view of the first embodiment shown in FIG. 4. Accordingly, the second embodiment is shown to include an alternative igniter 200 in place of the igniter 24 described above. The second embodiment of the present invention is otherwise the same as the first embodiment.

As indicated by the use of the same reference numbers in FIGS. 6 and 4, the igniter 200 has many parts that are substantially the same as corresponding parts of the igniter 24. Such parts include a pair of electrode pins 102 and 104 with inner end portions 106 and 110 projecting into the storage chamber 16. The inner end portions 106 and 110 of the electrode pins 102 and 104 have respective terminal end surfaces 126 and 128 with spherical contours. The terminal end surfaces 126 and 128 define corresponding opposite ends of an electrode gap 130. Like the electrode gap 130 of FIG. 4, the electrode gap 130 of FIG. 6 has a range of lengths D1–D2 defined by the oppositely facing arcuate contours of the terminal end surfaces 126 and 128.

An ohmic heating element in the form of a bridgewire 202 bridges the gap 130 in the igniter 200. Like the bridgewire 120 described above, the bridgewire 202 has a pair of opposite end portions 204 and 206 which are fixed to the terminal end surfaces 126 and 128, respectively, at joints 208 defined by electrical resistance welds 210. A major portion 212 of the bridgewire 202 extends in an arcuate configuration between the end opposite end portions 204 and 206. The bridgewire 202 also has a predetermined length bridging the gap 130. However, as a result of the arcuate configuration of the major portion 212, the bridgewire 202 has a length which is greater than the greatest length D2 of the gap 130. The major portion 212 of the bridgewire 202 also projects more directly away from the end surfaces 126 and 128 in a more nearly radial manner as a result of its arcuate configuration.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

combustible fluid;

a pair of electrodes having a corresponding pair of surface portions which are spaced from each other across an electrode gap; and an ohmic heating element immersed in said combustible fluid, said heating element bridging said gap in an ignitable heat transferring relationship with said combustible fluid and having a pair of opposite end portions which are mounted on and fixed to said surface portions of said electrodes at a corresponding pair of joints defined by electrical resistance welds;

said surface portions of said electrodes having arcuate contours facing oppositely across said gap, said arcuate contours diverging from said joints; and wherein said surface portions of said electrodes are defined by terminal end surfaces of said electrodes.

2. Apparatus as defined in claim 1 wherein said arcuate contours are spherical.

3. Apparatus as defined in claim 1 wherein said heating element is a bridgewire having a major portion extending between said end portions, said major portion having a circular cross-sectional shape, said end portions having non-circular cross-sectional shapes which are flattened relative to said circular cross-sectional shape of said major portion.

4. Apparatus comprising:

combustible fluid;

a pair of electrode pins having central axes, cylindrical side surfaces centered on said axes, and terminal end surfaces extending across said axes, said terminal end surfaces of said electrode pins being spaced from each other across an electrode gap and having arcuate contours facing oppositely across said gap; and an ohmic heating element immersed in said combustible fluid, said heating element bridging said gap in an ignitable heat transferring relationship with said combustible fluid and having a pair of opposite end portions which are mounted on and bonded directly to said terminal end surfaces of said electrode pins.

5. Apparatus as defined in claim 4 wherein said arcuate contours are spherical.

6. Apparatus as defined in claim 4 wherein said end portions of said heating element are bonded directly to said terminal end surfaces of said electrode pins at a corresponding pair of joints defined by electrical resistance welds, said arcuate contours diverging from said joints.

7. Apparatus as defined in claim 6 wherein said heating element is a bridgewire having a major portion extending between said end portions, said major portion having a circular cross-sectional shape, said end portions having non-circular cross-sectional shapes which are flattened relative to said circular cross-sectional shape of said major portion.

8. Apparatus comprising:

combustible material;

a pair of electrode pins having central axes, cylindrical side surfaces centered on said axes, and terminal end surfaces extending across said axes, said terminal end surfaces of said electrode pins being spaced from each other across an electrode gap and having arcuate contours facing oppositely across said gap; and an ohmic heating element bridging said gap in an ignitable heat transferring relationship with said combustible material, said heating element having a pair of opposite end portions which are mounted on and bonded directly to said terminal end surfaces of said electrode pins.

9. Apparatus as defined in claim 8 wherein said arcuate contours are spherical.

10. Apparatus as defined in claim 8 wherein said end portions of said heating element are bonded directly to said terminal end surfaces of said electrode pins at a corresponding pair of joints defined by electrical resistance welds, said arcuate contours diverging from said joints.

11. Apparatus as defined in claim 10 wherein said heating element is a bridgewire having a major portion extending between said end portions, said major portion having a circular cross-sectional shape, said end portions having noncircular cross-sectional shapes which are flattened relative to said circular cross-sectional shape of said major portion.

* * * * *